Patented Sept. 14, 1948

2,449,050

UNITED STATES PATENT OFFICE 2,449,050

CATALYTIC CONVERSION OF HYDROCARBONS WITH A CERIUM PHOSPHATE CATALYST

George R. Bond, Jr., Paulsboro, N. J., and George Alexander Mills, Ridley Park, Pa., assignors to Houdry Process Corporation, Wilmington, Del., a corporation of Delaware No Drawing. Application March 1, 1946, Serial No. 651,426

5 Claims. (Cl. 196—52)

1

The present invention relates to the catalytic conversion of hydrocarbons such as fractions obtained or derived from petroleum or other carbonaceous or hydrocarbonaceous materials. It is chiefly concerned with catalytic conversion employing cracking catalysts. A "cracking catalyst" is understood in the art as one promoting essentially the scission of carbon to carbon linkages in hydrocarbon compounds, although other chemical reactions including condensation may and ordinarily do coincidentally take place.

Among the objects of the present invention are to provide new processes for the catalytic conversion of hydrocarbons employing novel cracking catalysts.

In accordance with a preferred form of the present invention a hydrocarbon material is catalytically treated at elevated temperature under conversion conditions in contact with a cerium phosphate.

A principal application of this invention is in the cracking to gasoline of hydrocarbon materials higher boiling than gasoline. Following such a contacting operation, gasoline is separated from the synthetic crude. The gasoline so separated has been found to be exceptionally stable and to have a high octane value and a high blending value. Other applications of this invention involve the treating of gasoline under cracking conditions resulting in improvement of its stability and in improvement of its octane value; the reforming of naphthas resulting in increased octane value and in many instances in a lowering of the boiling range; and also the cracking of hydrocarbon gases.

The contact masses employed in accordance with the present invention are in general produced by the interaction in aqueous menstruum of a compound of cerium and a phosphate, including in the latter term hydrogen phosphates, commonly known as phosphoric acids. Advantageously the cerium compound employed is a fairly soluble cerous salt such as the acetate, chloride or sulfate. Alternatively, an insoluble compound such as the tri- or tetravalent oxide or hydroxide may be employed in dispersed form for reaction with the phosphate. Likewise, soluble phosphates are preferred such as alkali metal or ammonium phosphate as such, or the same may be formed in the reaction mixture employing for instance ortho or meta phosphoric acid and an alkaline reacting salt or base. The cerium phosphate formed, depending upon the specific reactants employed and the concentrations, may be a precipitate or a gel.

2

The cerium phosphate may be washed free or substantially free of other cations and anions if desired and is preferably dried prior to washing. In accordance with a preferred form of the invention, the cerium phosphate is formed into pellets or other discrete pieces in any known or desired manner and the obtained pieces calcined at elevated temperature at above 500° F. For instance the washed or unwashed product may be filtered and partially dried to form a cake which can be broken up to lumps of suitable size or the same may be cast or extruded to pieces of desired size and shape with adjustment of the water content to proper advantage for the particular forming process employed, that is the wet product may be reduced in water content or water added to the dried product as required.

Although the contact material is referred to herein as cerium phosphate for convenience, it cannot be definitely asserted that the mass comprises a combination of cation and anion or comprises a plurality of oxides. Apparently even though precipitating reactions to form the product involve stoichiometric ratios, such ratios may not be retained on calcination, in fact there are some indications that dissociation does occur at least in part at these high temperatures. The invention accordingly is not limited to any particular salt structure or composition but includes the products of interaction of the stated types of reagents, yielding products consisting essentially of combinations of cerium, phosphorus and oxygen, which are herein referred to for expedience as cerium phosphate.

It is within the scope of the present invention to employ contact masses in which the cerium phosphate is deposited or precipitated in or on a suitable support or carrier, which may be comparatively inactive such as kieselguhr, fuller's earth or bauxite, or an earth or clay having more or less catalytic activity such as a kaolin or an acid-activated bentonite, or a synthetic gel such as silica or silica-alumina.

The cerium compound employed in the reactions above designated need not be a pure compound, so long as metals or compounds deleterious to catalytic cracking, such as compounds of iron or nickel, are kept at a minimum. Naturally occurring rare earth minerals rich in cerium offer a convenient source for the cerium product to be combined with the phosphate. The natural cerium-containing earth may be extracted with an acid such as sulfuric, or rare earth oxides and related metal oxides in admixture from a natural earth may be dissolved in other solubilizing acids such as acetic. The acid liquor containing cerium and other rare earth and closely allied salts may then be precipitated with an alkaline phosphate. Undesired metal compounds may be conveniently removed from the acid liquor previous to phosphate formation by selective or fractional precipitation with suitable reagents.

Monazite, which contains cerium compounds as the principal rare earth metal compound present, with lesser portions of thorium compounds and other rare earth compounds, has been found an excellent starting material for the preparation of cerium-phosphate containing catalysts. The monazite may be extracted with mineral acid and the mixed cerium and other rare earth salts and thorium salts so formed may be precipitated as phosphates in mass or deposited on a suitable carrier. Alternatively, of course, one or more of the metal salts present in the acid liquor may be selectively removed; for instance, thorium can be removed by hot precipitation with $Na_2S_2O_3$. Since monazite contains the rare earth metal compounds in natural state chiefly as phosphates, the invention also includes the use of the natural earth per se in hydrocarbon conversion processes of the types herein designated, as well as contact masses in which the monazite is admixed with or deposited on a suitable matrix or carrier such as silica gel or clay.

In the use of the catalysts of the present invention, the usual conditions of cracking can be availed of without modification, the catalyst being in the form of fine particles, granules, globules, pellets or the like. The described catalyst can be employed in fixed bed processes for cracking of petroleum fractions as well as in processes in which the catalyst moves through the reaction zone. As an example of a fixed bed operation, cracking may be carried out at a temperature of 800–900° F., employing a space rate (volume of charge liquid basis per volume of catalyst per hour) of about 1.5 and a pressure of about 15 pounds per square inch gauge. The temperature, of course, may be varied within the range of about 700 to 1100° F., the space rate within the range of about 0.5 to 8 and pressures may be employed from about atmospheric or slightly lower up to about 100 pounds per square inch or higher. Under these conditions the operating period "on stream" may range from five to sixty minutes, for example 10 to 30 minutes alternating with regeneration periods. In commercial operations temperatures above 750° F. are preferred. Steam may be added to the charge stock and is particularly advantageous in assisting the vaporization of heavier stocks.

In processes other than the fixed bed, such as where the catalyst moves through the reaction zone, the conditions employed may be such as to subject the oil to substantially equivalent conditions including contact time and ratios of oil to catalyst as those set out above in connection with the fixed bed process.

Reforming may be carreid out in accordance with the invention by charging a virgin or cracked gasoline or naphtha fraction under conditions similar to those employed in cracking.

Whereas in the fixed bed operation the catalyst is alternately subjected to regeneration, in the other processes the catalyst is passed during its cycle through a separate regeneration zone. In all of these processes regeneration is effected by contacting the catalyst after use, with air or other oxygen-containing gas to burn off carbonaceous deposit.

Catalyst of the present invention also find use in synthesis reactions, for example, polymerization of gaseous hydrocarbons to liquid products, details of which are more fully described in our copending application Serial No. 780,108, filed October 15, 1947.

Various specific embodiments are illustrated in the following examples.

*Example I*

Two solutions were prepared, one by dissolving 115 parts of cerium nitrate $$[Ce(NO_3)_3 \cdot 6H_2O]$$

in 1680 parts of water. The second solution was prepared by dissolving 91.5 parts of mono-ammonium phosphate ($NH_4H_2PO_4$) in 1680 parts of water and 63 parts of 28% aqua ammonia added thereto. The second solution was poured into the first and about 9 parts of phosphoric acid ($H_3PO_4$) added with agitation. A gel was formed at 7.2 pH. (Above proportions are given by weight.)

The gel above formed was allowed to stand for one hour, then filtered and dried at 250° F. with circulation of air through the gel. The dried gel, which was a hard, dark brown, granular product, was water washed until free of $NO_3$ and Ce; at this stage only traces of $PO_4$ were tested in the wash water. The washed gel was pan dried at 250° F. and formed into 6 mm. pellets.

The pellets above formed were calcined in air at 1050° F. for two hours and employed in cracking a light East Texas gas oil under the following operating conditions: 800° F., atmospheric pressure, liquid space rate of 1.5, ten minute on stream periods. There was obtained from the charge stock about 19% gasoline based on volume of feed.

A phosphate catalyst may be similarly prepared by employing a mixture of soluble rare earth salts such as acetate predominating in cerium acettae instead of the cerium nitrate.

*Example II*

Monazite sand was digested with concentrated sulfuric acid with stirring over a period of three hours at a temperature just below boiling, then cooled and poured into water. The residue was further extracted with water until no more dissolved.

Sodium silicate diluted with water was added to the above solution in calculated proportions to obtain 90% $SiO_2$ by weight to 10% of the dried phosphate weight and aqueous ammonia added to pH 8. The mass set to a firm gel in about five seconds, which was permitted to stand for an hour.

The gel was granulated and dried at 180°–200° F., then washed with water and ammonium chloride solution a number of times to remove sodium ions and again dried.

The dried product was ground and made into a smooth paste which was cast into 4 mm. pellets. The pellets were dried at 105° C. and calcined for five hours at 1400° F. in air containing 6.5% by weight of steam. The catalyst so prepared, was tested in the cracking of a light East Texas gas oil under the conditions stated in the preceding example, and gave a yield of 15.4% by volume of gasoline, with only 0.9% by weight of coke and 1.3% by weight of gas.

The obtained gasoline/coke and gasoline/gas ratios indicate that the catalyst is particularly valuable in cracking of heavy stocks which ordinarily produce large quantities of coke. The gasoline yield on cracking of lighter stocks can be increased by omitting the steam in calcining the catalyst.

As an example of depositing a natural phosphate on a carrier, monazite sand as a fine powder may be batched with about four times its weight of kaolin or other clay and water added to make a thick paste. A small amount of kerosene or gas oil mixed into the paste will assist extrusion of the paste into rods which can be broken up into catalyst pellets.

Obviously many modifications and variations of the invention as hereinbefore set forth may be made without departing from the spirit and scope thereof and therefore only such limitations should be imposed as are indicated in the appended claims.

We claim as our invention:

1. In the catalytic production of valuable hydrocarbon materials, the process which comprises subjecting a hydrocarbon oil under catalytic cracking conditions to contact with a catalyst comprising a cerium phosphate as the principal catalytically active component present therein.

2. In the catalytic production of liquid hydrocarbons in the gasoline boiling range the process which comprises cracking a hydrocarbon material heavier than gasoline by subjecting the material at a temperature above 700° F. to contact with a catalyst resulting from the calcination of the reaction product of a soluble cerium compound and a soluble phosphate.

3. The process which comprises cracking a hydrocarbon material by contacting the material at a temperature between 700°–1100° F. and at a liquid space rate of 0.5 to 8 with a calcined reaction product of a cerium compound and a phosphate.

4. In the catalytic production of gasoline from hydrocarbons of average boiling range higher than gasoline, the process which comprises cracking the higher boiling hydrocarbons in the presence of a catalyst consisting essentially of cerium phosphate, and separating from the reaction products a fraction of gasoline boiling range.

5. The process which comprises cracking petroleum hydrocarbons in the presence of a catalyst consisting of the reaction product of an ammonium phosphate and a soluble cerium salt, the cracking operation being conducted at a temperature of 800°–900° F. employing a liquid space rate of about 1.5.

GEORGE R. BOND, Jr.
GEORGE ALEXANDER MILLS.

REFERENCES CITED

The following references are of record in the file of this patent:

UNITED STATES PATENTS

| Number | Name | Date |
|---|---|---|
| 2,288,874 | Anderson et al. | July 7, 1942 |
| 2,301,734 | Melaven et al. | Nov. 10, 1942 |
| 2,301,913 | Veltman | Nov. 17, 1942 |
| 2,378,209 | Fuller et al. | June 12, 1945 |